Aug. 23, 1949.    R. W. CRIST    2,479,816
CAR DUMPER

Original Filed Sept. 13, 1943    4 Sheets-Sheet 1

INVENTOR.
ROBERT W. CRIST
BY
Kwis Hudson Boughton & Williams
ATTORNEYS

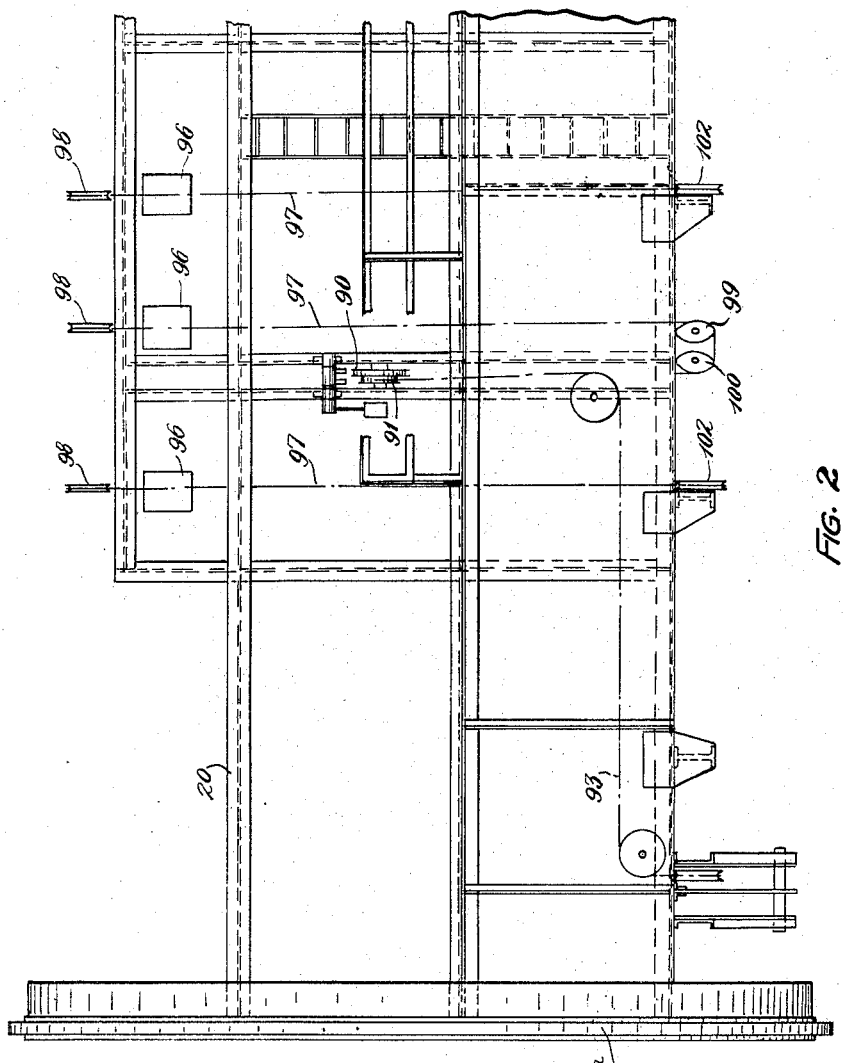
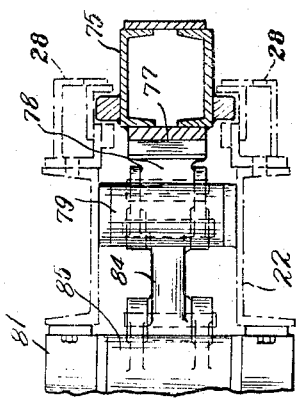

Aug. 23, 1949.  R. W. CRIST  2,479,816
CAR DUMPER

Original Filed Sept. 13, 1943  4 Sheets-Sheet 3

INVENTOR.
BY ROBERT W. CRIST
Kurs Hudson Boughton & Williams
ATTORNEYS

Patented Aug. 23, 1949

2,479,816

UNITED STATES PATENT OFFICE 2,479,816

CAR DUMPER

Robert W. Crist, Cleveland, Ohio, assignor to The Wellman Engineering Company, Cleveland, Ohio, a corporation of Ohio Continuation of abandoned application Serial No. 587,702, April 11, 1945, which is a division of application Serial No. 502,151, September 13, 1943. This application February 18, 1946, Serial No. 648,461

11 Claims. (Cl. 214—55)

This invention relates to car dumpers and particularly to car dumpers of the rotary non-lifting type. More particularly the invention relates to the car clamps for holding the car on the rails of the dumper while the cradle of the dumper is being turned to discharge the material from the car.

This application is a continuation of my copending application Serial No. 587,702, for Car dumper, filed April 11, 1945, and now abandoned, which application is a division of my prior application Ser. No. 502,151, for Car dumper, filed September 13, 1943, and issued on August 7, 1945, as Patent No. 2,381,723.

The principal object of the invention is to provide controls and actuating means for clamps of a car dumper of such a nature that the clamps on one side of the cradle of the dumper are wholly independent of the clamps on the other side so that it becomes unnecessary to provide the same number of clamps on each side and it is possible to provide a greater number of clamps on the inner or dumping side than on the rear side. The clamps being independent of each other, failure of one to act does not prevent any other clamps from acting.

A further object is to provide a clamp holddown mechanism of such a nature that there are no clamp holddown ropes, thus avoiding possibility of accident due to failure of ropes or the outward movement of the car in the cradle due to stretch in the ropes while in the dumping position and eliminating ropes and their maintenance.

Still further the invention aims to provide a simplified construction and one which eliminates many parts and considerable weight.

A further object is to provide mechanism for controlling and actuating the clamps of such a nature that the mechanism is not located at a point where it is likely to become covered with dust and the like from the coal, ore or other material being discharged during the dumping operation, as is the case with dumpers in use at the present time.

A further object is to provide a positive releasing arrangement for the clamps to prevent the breakage of clamp lifting ropes.

A still further object is to provide a clamp lifting arrangement which at all times provides sufficient tension in the clamp lifting ropes to prevent sag in the ropes and to keep the ropes on their sheaves.

The above and other objects are attained by my invention which may be here briefly summarized as consisting in certain details of construction and combinations and arrangements of parts which will be described in the specification and set forth in the appended claims.

In the accompanying sheets of drawings,

Fig. 2 is a partial side elevational view of the dumper as seen from the rear thereof, certain of the parts including the sheaves and ropes being shown diagrammatically;

Fig. 6 is a transverse sectional view through the clamp actuating mechanism, with parts in elevation, and illustrated as positioned in accordance with the broken line showing thereof in Fig. 4;

Figure 1:
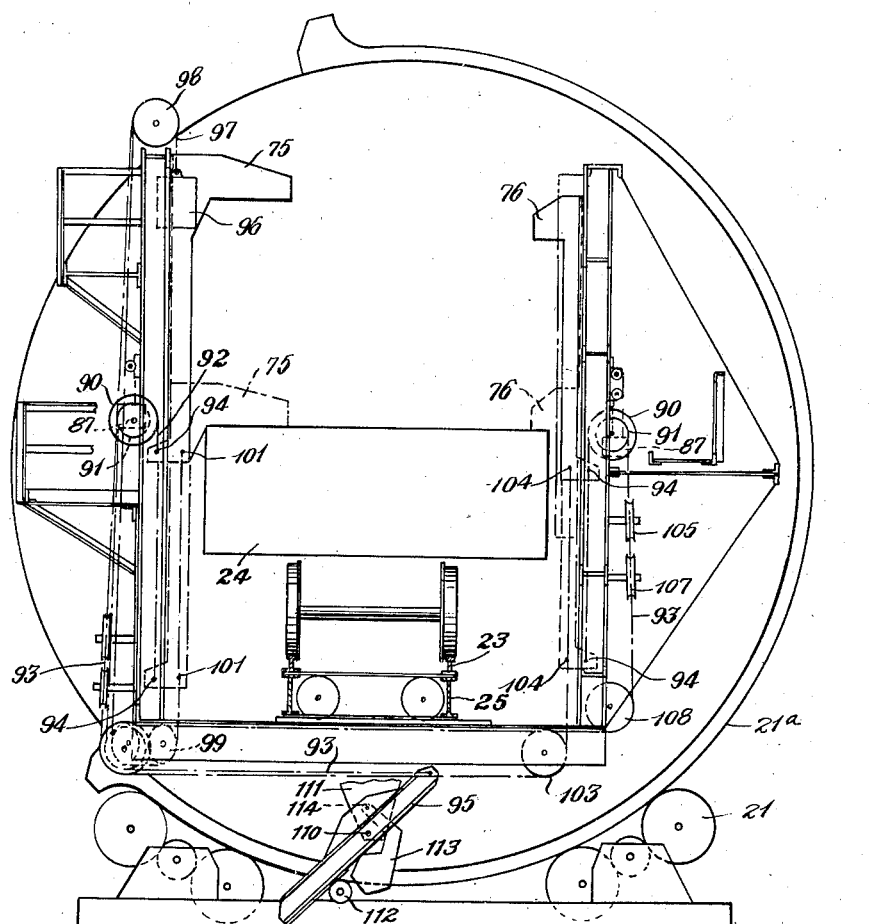
Fig. 1 is a partial end elevation of a dumper, constructed in accordance with this invention, the dumper being shown with a car in upright position thereon just prior to the dumping operation.
Figure 3:
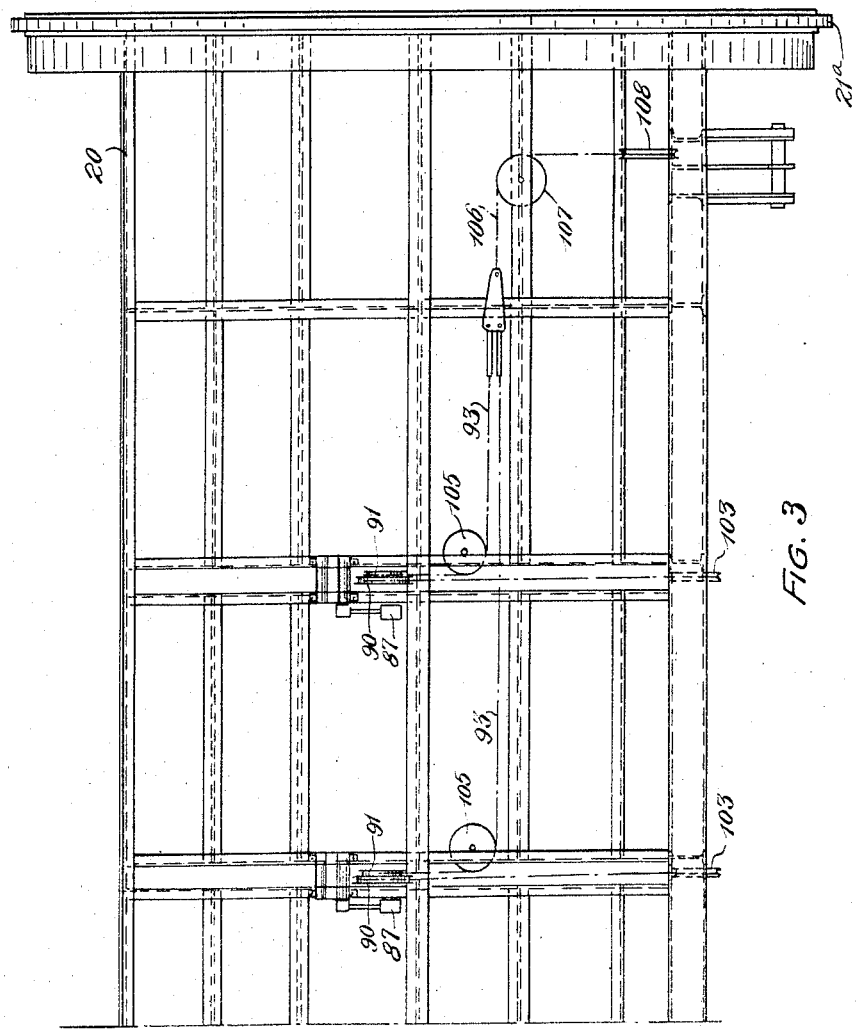
Fig. 3 is a partial side elevational view of the dumper as seen from the dumping side thereof, some of the parts such as the sheaves and ropes being shown diagrammatically.

Referring now to the drawings, the frame of the rotary dumper is shown in Figs. 2 and 3 at 20 and is supported in the usual manner on rollers 21 engaging tracks 21a located at opposite ends of the dumper frame, see Figure 1. 22 represents the cradle of the dumper which is provided with rails 23 on which a loaded car 24 is adapted to run. The cradle and clamps are, as usual, arranged so as to accommodate cars of different heights, as, for example, cars ranging from a minimum height of 7 feet to a maximum height of 12 feet 3 inches. The rails 23 are mounted on a laterally movable platen 25 which during the dumping operation moves toward the dumping side of the cradle until the car engages the blocking on the spill apron on that side. The means for rotating the dumper and for controlling the movement of the platen are not shown as devices for accomplishing these purposes are well known in the art and any suitable means may be employed.

The present invention relates particularly to the car clamps and to the means for lowering and elevating them. It is an important feature of the present invention that the clamps are wholly independently controlled or operated, making it possible to provide a greater number of clamps on the dumping side than on the rear side. In this instance I employ six clamps, four located on the dumping side and two on the rear side where the load on the clamps is a great deal less than on the dumping side. However, different numbers of clamps may be used, as, for example, six on the dumping side and three on the rear side, but they need not of necessity be of such numbers that those on the dumping side are multiples of those on the rear side.

The clamps on the rear side of the dumper are designated 75 and those on the dumping side are designated 76. These clamps slide in vertical guides 28 of the cradle (see Fig. 6). The clamps are lowered onto the top of the car 24 by gravity assisted by counterweights 96 which are arranged on the top rear side of the cradle.

Considering next the mechanism by which the clamps are controlled, in the form of the invention illustrated, I have provided rack teeth on the rear sides of the shanks of the clamps which teeth are engaged by pawls. Appropriate mechanism, hereinafter described, is provided for causing the engagement and disengagement of the pawl from the rack, it being one of the important features of the present invention that there is provided a positive releasing arrangement for the pawls from the rack teeth to prevent breakage of the clamp lifting ropes.

As shown in the drawings, the rear sides of the shanks of the clamps 75 and 76 have pawl racks 77 attached thereto, these racks extending from the upper ends of the clamps downwardly for a suitable distance along the shanks, the pawl mechanisms for the clamps on the rear and dumping sides of the cradle, although composed of similar parts, are somewhat differently arranged.

Figures 4, 5:
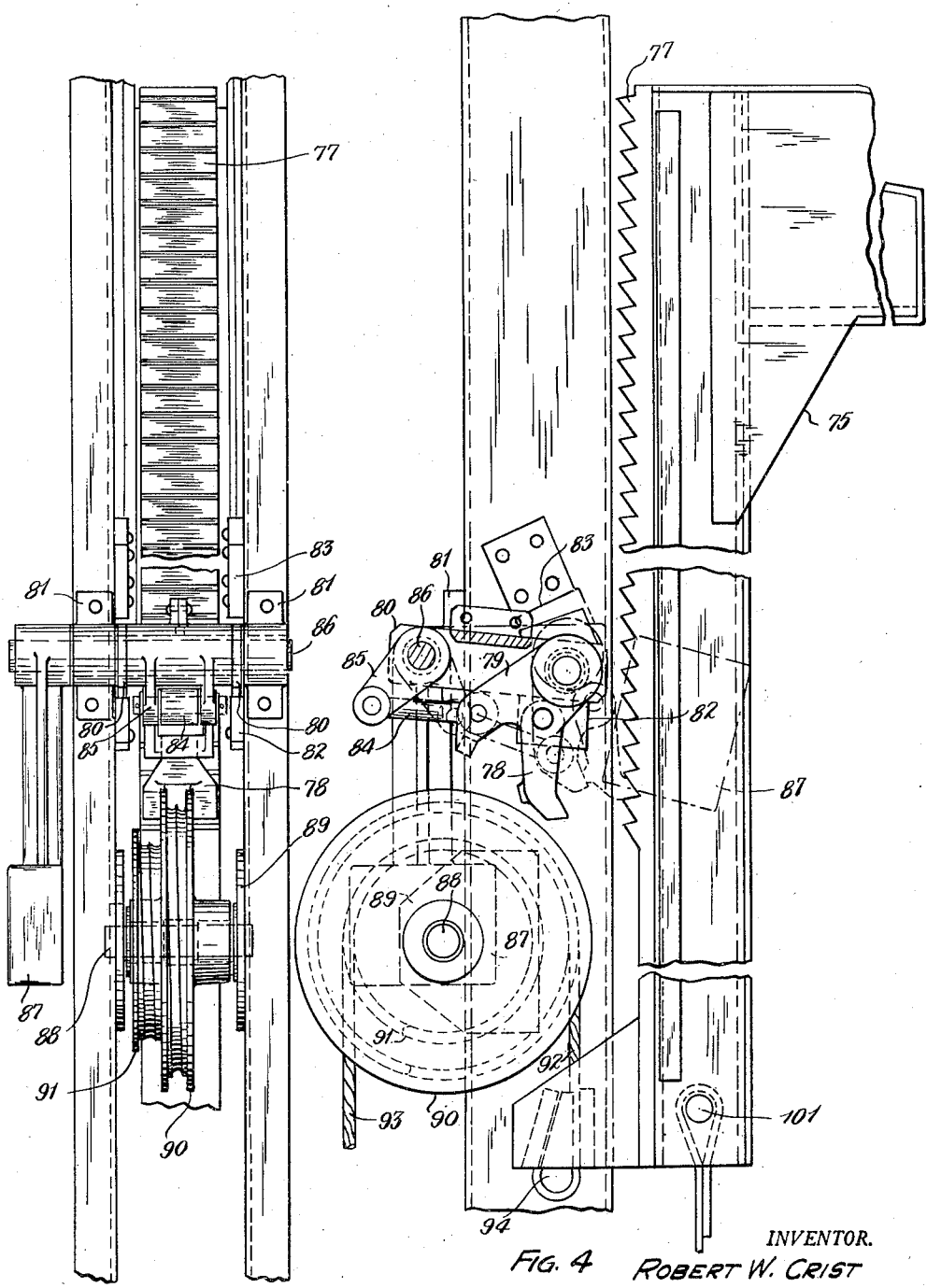
Fig. 4 is an enlarged fragmentary view, partly in section and partly in elevation, showing a portion of one of the rear clamps and the mechanism for actuating it.
Fig. 5 is an elevational view of the construction shown in Fig. 4 as seen from the left thereof.

I will first describe the pawl mechanism for the clamps on the rear side of the cradle, reference being had to Figs. 4, 5 and 6. The racks 77 are adapted to be engaged by pawls 78 which are pinned to pawl supports 79 which in turn are pinned to the inner end of an arm 80. Arm 80 is pinned at its outer end to a pair of brackets 81 which are secured to the side of the cradle frame. The arm 80 is permitted a slight movement between a bottom stop 82 and a top stop 83 which are also secured to the cradle frame in order to provide what may be termed backlash to compensate for the deflection of the car springs when the material is dumped from the car. This feature is provided for the reason that when a loaded car enters the cradle the springs of the car trucks are compressed possibly as much as 7/8" or 1", and it is obvious that, if the hooks or clamps have made snug engagement with the car top, when the empty car is returned to upright position the car truck springs would exert a pressure on the clamps, which pressure would in turn create a pressure of the pawls on the rack teeth to hinder their release. It is almost certain that this pawl pressure would be overcome by the knuckling action of the pendulum counterweights as hereinafter described, but this movement of the arm is provided as an additional feature of safety.

The pawl support 79 is connected by means of a link 84 to a crank 85 which is keyed to a pin 86 which in turn is supported by the brackets 81 previously referred to. Also keyed to the pin 86 is a pendulum counterweight 87. Just below the mechanism for locking the pawl to the rack there is mounted on a pin 88 a differential drum secured in brackets 89 in turn secured to the cradle frame. This differential drum, which is scored for receiving ropes, is composed of a larger section 90 and a smaller section 91. The larger section 90 of the differential drum has secured to it a clamp lifting rope 92 to be referred to presently. To the smaller section 91 of the drum and to the opposite side thereof a clamp lifting rope 93 is attached which rope leads over suitable deflecting sheaves to a clamp lifting arm hereinafter described. The differential drum is used to provide for considerable travel of the clamps which is necessary when the dumper is designed to dump cars of widely varying heights. When designed for use with cars varying only slightly in height, the differential drum can be replaced by a single scored drum or sheave and the clamp lifting ropes can then be made in a single piece. It will be understood that the ropes 92 and 93 pass a suitable distance around the drum sections 90 and 91 before being secured thereto.

Figure 7:
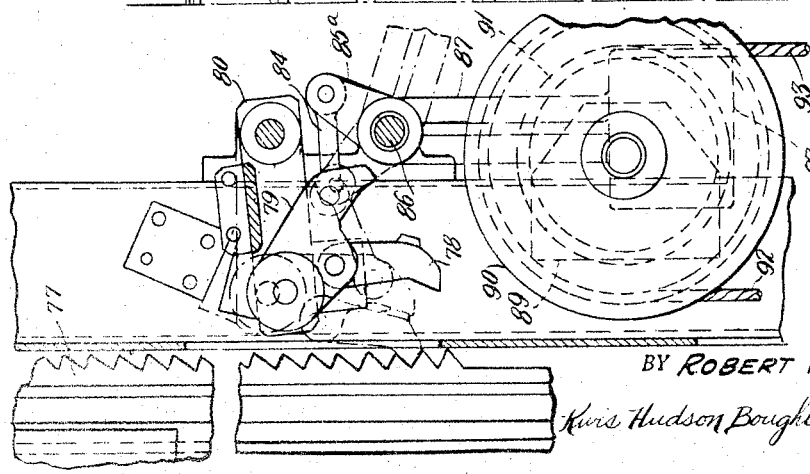
Fig. 7 is a view similar to Fig. 4 illustrating a clamp actuating mechanism for a clamp on the dumping side of the apparatus.

The construction of the pawl mechanism for the clamps 76 on the dumping side of the dumper is shown in Fig. 7. By referring to this figure, it will be noted that the pawl 78 is pinned, as in the mechanism described in connection with clamp 75, to a pawl support 79 which in turn is pinned to the inner end of an arm 80. The pawl support 79 is connected by a link 84, corresponding to the link 84 of the construction described in connection with clamp 75, to a crank 85a which extends upwardly instead of downwardly, this crank being keyed to a pin 86 similar to that first described. Also keyed to the end of pin 86 is a pendulum counterweight 87. Mounted as before in a pair of brackets 89 is a differential drum composed of two parts 90 and 91 on which are wound and secured two clamp lifting ropes 92 and 93.

The clamp lifting ropes 92 of the pawl controlling mechanism for the clamps on both the rear and dumping sides are attached at 94 to the lower ends of the car clamps. Each of the ropes 93 passes around the drum section of smaller diameter, then passes around suitable deflecting sheaves and is attached to a clamp lifting arm 95, the function of which together with the reeving of the ropes being hereinafter described.

A separate counterweight 96 is connected to each of the car clamps 75 and 76 by individual ropes 97, the counterweights 96 for all the clamps being positioned adjacent the top of the rear side of the cradle. Thus, it will be noted that the rope 97 for each of the counterweights 96 passes around a sheave 98 arranged at the top of the cradle frame. The ropes 97 for two (or more) rear clamps of the dumper extend downwardly and around a pair of sheaves 99 and 100 (see Fig. 2) and lead upwardly and are attached to the lower ends of the shanks of the clamps 75 at 101. The ropes 97 for the clamps 76, after passing around sheaves 98, extend downwardly around sheaves 102 (see Fig. 2), then across the bottom of the dumper and around sheaves 103 (see Fig. 3) and then upwardly and are attached to the lower ends of the shanks of the car clamps 76 at 104.

Figures 8, 9:
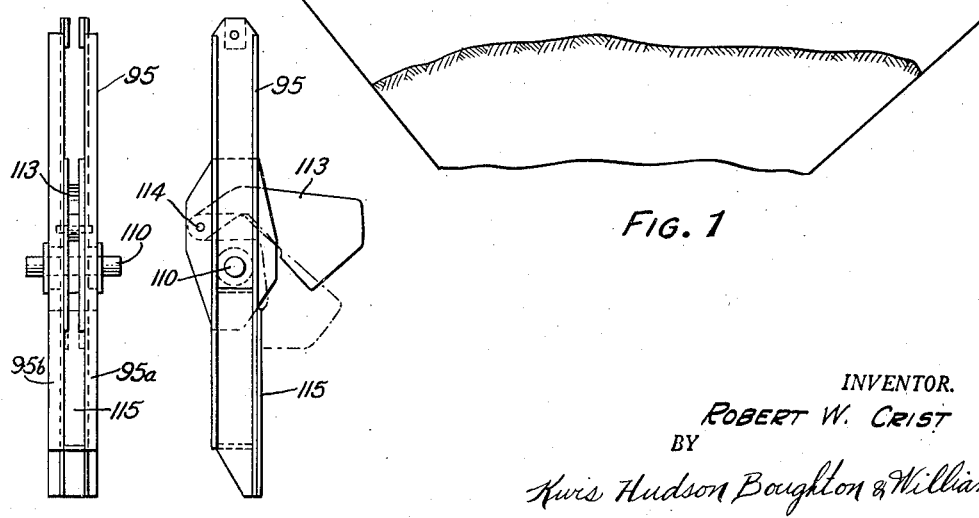
Fig. 8 is a top view of one of the clamp lifting arms which is attached to the bottom of the dumper.
Fig. 9 is a side view of the clamp lifting arm.

At each end of the dumper is a clamp lifting arm 95, each arm being pivoted on a pin 110 which is secured to a bracket 111 on the underside of the cradle frame. One of these arms is shown in Fig. 1, and it will be understood that the construction will be identical at the opposite end of the dumper. Each clamp lifting arm 95, when the cradle is being restored to its normal upright position, engages a roller 112 attached to the sill on the foundation of the dumper. As shown in Figs. 8 and 9, each arm 95 is formed by two spaced members 95a and 95b between the upper portions of which a pendulum counterweight 113 is pivotally mounted by a pin 114. A plate 115 joins the lower portions of the two members 95a and 95b of each arm 95 so that the pendulum counterweight swings through the upper half and not through the lower half of the arm.

The ropes 93 which pass around the smaller sections 91 of the drums for the two clamps on the rear side of the dumper extend downwardly and around suitable deflecting sheaves and are then attached respectively to the upper ends of the forward and rear clamp lifting arms 95. The ropes 93 which pass around the smaller sections 91 of the drums for the two rear clamps on the dumping side pass around sheaves 105 (see Fig. 3) and are then joined together and to a rope 106 which, after passing around upper sheaves 107 and lower sheaves 108, extends across the bottom of the dumper around a sheave at the left-hand side (as viewed in Fig. 1) and then back to the upper ends of the rear clamp lifting arm 95. The ropes 93 for the other two clamps on the dumping side are similarly connected to the forward clamp lifting arm 95 (see Fig. 1).

With a loaded car in upright position on the cradle and the clamps 75 and 76 elevated to clear the top of the car, rotation of the cradle is started in the dumping direction (clockwise as viewed in Fig. 1), and the platen immediately moved to the dumping side of the cradle until the car engages the blocking on the spill apron on that side. At the same time the clamp lifting arms 95 begin rotation in a counterclockwise direction, paying out the clamp lifting ropes 92 and 93. As the ropes 92 and 93 are paid out, the clamps 75 and 76 descend in their guides to the top of the car partly through gravity and partly through the constant pull of the counterweights 96 attached to the clamps. The descent of the clamps will be as fast as permitted by the paying out of the clamp lifting ropes 92 and 93 and will continue until the clamps engage the top of the car. When rotation has progressed about 75°, the pendulum counterweights 87 have forced the pawls 78 into engagement with the pawl racks 77 on the shanks of the clamps, thus locking the clamps against the top of the car. Before this point is reached, the clamp lifting arms 95 have become disengaged from the rollers 112 which, as before stated are attached to the sill on the foundation of the dumper, but the pendulum counterweights 113 are positioned on the arms in such a way as to always tend to produce a clockwise rotation of the arms 95, thus providing sufficient tension in the clamp lifting ropes to prevent undue sagging and to keep the ropes on their sheaves.

With the car securely held in the cradle by the clamps which are locked by the action of the pawls 78 on the pawl racks 77, rotation is continued until the cradle has been rotated about 150° from its normal position, and when this point is reached all of the material of the car has been discharged therefrom.

Since the holding action of the clamps against outward movement of the car is produced by a locking action of the pawls 78 on the racks 77 rather than by direct pressure from the counterweights, no excess pressure can be applied to crush the top of the car.

When the material has been discharged from the car, the cradle is rotated in the opposite direction. When it is rotated past the point where the car is in horizontal position and further on to a point where it is inclined about 70° from the vertical, the pendulum counterweights 87 act to knuckle out or disengage the pawls 78 from the racks 77, leaving the clamps free to be lifted from the top of the car by the clamp lifting arms 95.

This clamp lifting operation begins somewhat after the racks are freed and when the clamp lifting arms 95 first engage the rollers 112 attached to the sill. It continues until the cradle is in the upright position, when the clamps will be fully raised. The platen will by that time have moved sidewise to move the car out of contact with the spill apron and into alignment with the runoff tracks.

It sometimes happens (with prior car clamps) when dumping cars that a clamp will not descend entirely onto the car top but onto a lump of material lodged on the car top. While the cradle revolves, this lump may be crushed or may become dislodged, in which case, if rotation has progressed beyond 90°, the car will either sag toward the freed clamp or an additional load comes onto the remaining clamps on that side of the dumper. In the present instance, the counterweight 96 associated with the clamp in question acts to immediately bring the freed clamp into contact with the car top where it is instantly and positively reclamped by the pawl engaging with its rack. It will be noted, moreover, that with my improved method of clamping, the clamp failing to engage the car top for the reason above mentioned is the only car clamp freed when the lump is dislodged since all of the clamps act independently. If the clamps were arranged in pairs and each pair held against the car top by a common rope, as in the method employed heretofore, it is obvious that two clamps would be freed, one on each side of the car.

An important advantage of my improved car clamping arrangement lies in the fact that when a pawl 78 is engaged with its rack 77, the pin which pivots the pawl to the pawl support 79 is practically on a line passing from the center line of the pin, at the inner end of arm 80, to the center of the tooth of the pawl thereby providing a toggle-like lock for the pawl and only a slight effort of the pendulum counterweight 87 will knuckle the pawl out of engagement with the rack and insure quick and easy release of the clamp preparatory to being raised by the clamp lifting arms.

It will be seen that the arm 80 is free to move toward the stop 83 to provide the backlash to compensate for the extension of the car springs after the load has been dumped from the car. Additionally, it will be seen that the pendulum counterweights 113 connected to the clamp lifting arms 95 insure sufficient tension at all times in the clamp lifting ropes to prevent sag in the ropes and to keep the ropes on their sheaves.

Thus it will be seen that, with the construction shown and described, the various objects stated in the early part of the specification are very effectively attained. I do not desire to be confined to the precise details shown but aim in my claims to cover all modifications which do

Having thus described my invention, what I claim is:

1. In a rotary car dumper, a cradle adapted to receive a car and having a plurality of clamps engageable with the top of the car on both sides thereof to hold the car on the cradle while the car is being dumped, means for locking each clamp in car-holding position including a rack extending longitudinally of the clamp, a pawl adapted to engage said rack, a pendulum counterweight for controlling the movement of the pawl into and out of engagement with the rack, a drum supported on the frame of the cradle in association with each clamp, a rope connected to each clamp and extending about the associated drum, and clamp-lifting arms adapted to engage means at the bottom of the dumper and also having ropes extending about the drums.

2. In a rotary car dumper, a cradle adapted to receive a car and having a plurality of clamps engageable with the top of the car on both sides thereof to hold the car on the cradle while the car is being dumped, means for locking each clamp in car-holding position including a rack extending longitudinally of the clamp, a pawl adapted to engage said rack, a pendulum counterweight for controlling the movement of the pawl into and out of engagement with the rack, a drum supported on the frame of the cradle in association with each clamp, a rope connected to each clamp and extending in one direction about the associated drum and being attached thereto, and clamp-lifting arms adapted to engage means at the bottom of the dumper and having ropes also extending about the drums in the opposite direction and attached thereto.

3. In a rotary car dumper, a cradle adapted to receive a car and having a plurality of clamps engageable with the top of the car on both sides thereof to hold the car on the cradle while the car is being dumped, means for locking each clamp in car-holding position including a rack extending longitudinally of the clamp, a pawl adapted to engage said rack, a pendulum counterweight for controlling the movement of the pawl into and out of engagement with the rack, a drum supported on the frame of the cradle in association with each clamp, a rope connected to each clamp and extending about the associated drum, and clamp-lifting arms adapted to engage means at the bottom of the dumper and having ropes also extending about the drums, the pendulum counterweights which control the movement of the pawls into and out of engagement with the racks having a toggle or knuckling action in releasing the pawl from the racks.

4. In a rotary car dumper, a cradle adapted to receive a car and having a plurality of clamps engageable with the top of the car on both sides thereof to hold the car on the cradle while the car is being dumped, means for locking each clamp in car-holding position including a rack extending longitudinally of the clamp, a pawl adapted to engage said rack, a pendulum counterweight for controlling the movement of the pawl into and out of engagement with the rack, a drum supported on the frame of the cradle in association with each clamp, a rope connected to each clamp and extending about the associated drum, and clamp-lifting arms adapted to engage means at the bottom of the dumper and having ropes also extending about the drums, there being provision for a slight movement of the clamps with the pawls engaged to provide a backlash to compensate for the extension of the car springs after the load has been dumped.

5. In a rotary car dumper, a cradle adapted to receive a car and having a plurality of clamps engageable with the top of the car on both sides thereof to hold the car on the cradle while the car is being dumped, means for locking each clamp in car-holding position including a rack extending longitudinally of the clamp, a pawl adapted to engage said rack, a pendulum counterweight for controlling the movement of the pawl into and out of engagement with the rack, a drum supported on the frame of the cradle in association with each clamp, a rope connected to each of said clamps and extending about the associated drum, and clamp-lifting arms adapted to engage means at the bottom of the dumper and having ropes also extending about the drums, the clamp-lifting arms having means serving to provide sufficient tension in the clamp-lifting ropes to prevent undue sag and to keep the ropes on their sheaves.

6. In a rotary car dumper, a cradle adapted to receive a car and having a plurality of clamps engageable with the top of the car on both sides thereof to hold the car on the cradle while the car is being dumped, means for locking each clamp in car-holding position including a rack extending longitudinally of the clamp, a pawl adapted to engage said rack, a pendulum counterweight for controlling the movement of the pawl into and out of engagement with the rack, a drum supported on the frame of the cradle in association with each clamp, a rope connected to each clamp and extending about the associated drum, clamp-lifting arms adapted to engage means at the bottom of the dumper and also having ropes extending about the drums, and counterweights connected to the clamps for holding the clamps in engagement with the top of the car.

7. In a rotary car dumper, a cradle adapted to receive a car and having a plurality of clamps engageable with the top of the car on both sides thereof to hold the car on the cradle while the car is being dumped, means for locking each clamp in car-holding position including a rack extending longitudinally of the clamp, a plurality of pawls each adapted to engage one of said racks, pendulum counterweights for controlling the movement of the pawls into and out of engagement with the racks, mechanism comprising toggle linkages operatively connecting said pendulum counterweights and said pawls, said mechanism having a knuckling action in releasing the pawls from the racks, and means for lifting said clamps when said pawls are released.

8. In a rotary car dumper, a cradle adapted to receive a car and having a plurality of clamps engageable with the top of the car on both sides thereof to hold the car on the cradle while the car is being dumped, means for locking each clamp in car-holding position including a rack extending longitudinally of the clamp, a plurality of pawls each adapted to engage one of said racks, pendulum counterweights for controlling the movement of the pawls into and out of engagement with the racks, mechanism comprising toggle linkages operatively connecting said pendulum counterweights and said pawls, said mechanism having a knuckling action in releasing the pawls from the racks, means providing for a slight movement of the clamps with the pawls engaged to provide a backlash to compensate for the extension of the car springs after the load has been dumped, and means for lifting said clamps when said pawls are released.

9. In a rotary car dumper, a cradle adapted to receive a car and having a plurality of clamps engageable with the top of the car on both sides thereof to hold the car on the cradle while the car is being dumped, means for locking each clamp in car-holding position including a rack extending longitudinally of the clamp, a plurality of pawls each adapted to engage one of said racks, pendulum counterweights for controlling the movement of the pawls into and out of engagement with the racks, mechanism for operatively connecting said pendulum counterweights and said pawls, said mechanism having a toggle or knuckling action in releasing the pawls from the racks and clamp lifting means comprising a pivoted lever carried by the cradle and engageable with stationary means at the bottom of the dumper.

10. In a rotary car dumper, a cradle adapted to receive a car and having a plurality of clamps engageable with the top of the car on both sides thereof to hold the car on the cradle while the car is being dumped, means for locking each clamp in car-holding position including a rack extending longitudinally of the clamp, a pawl adapted to engage said rack, a pendulum counterweight for controlling the movement of the pawl into and out of engagement with the rack, a drum supported on the frame of the cradle in association with each clamp, a rope connected to each clamp and extending about the associated drum, a clamp lifting lever pivotally connected to said cradle and adapted to engage means at the bottom of the dumper, a second drum supported on the frame of the cradle and operatively connected to the first-mentioned drum, and a rope or cable connected to said pivoted lever and extending about said second drum.

11. In a rotary car dumper, a cradle adapted to receive a car and having a plurality of clamps engageable with the top of the car on both sides thereof to hold the car on the cradle while the car is being dumped, means for locking each clamp in car-holding position including a rack extending longitudinally of the clamp, a pawl adapted to engage said rack, a pendulum counterweight for controlling the movement of the pawl into and out of engagement with the rack, a drum supported on the frame of the cradle in association with each clamp, a rope connected to each clamp and extending about the associated drum, a clamp-lifting lever pivotally connected to said cradle and adapted to engage means at the bottom of the dumper, a second drum of smaller diameter than the first drum, and a rope or cable connected to said pivoted lever and extending about said second drum.

ROBERT W. CRIST.

REFERENCES CITED

The following references are of record in the file of this patent:

UNITED STATES PATENTS

| Number | Name | Date |
|---|---|---|
| 1,570,943 | Case | Jan. 26, 1926 |
| 1,768,825 | Caldwell | July 1, 1930 |
| 1,787,812 | Brown | Jan. 6, 1931 |
| 1,821,217 | Heaton et al. | Sept. 1, 1931 |